April 3, 1951  R. N. TOZER  2,547,509
INTERNAL BROACH WITH WORK GUIDING MEANS
Filed Feb. 13, 1948

INVENTOR
*Ralph N. Tozer*
BY *Evans + McCoy*
ATTORNEYS

Patented Apr. 3, 1951

2,547,509

UNITED STATES PATENT OFFICE 2,547,509

INTERNAL BROACH WITH WORK GUIDING MEANS

Ralph N. Tozer, Detroit, Mich., assignor to Shatterproof Glass Corporation, Detroit, Mich., a corporation of Delaware Application February 13, 1948, Serial No. 8,175

4 Claims. (Cl. 90—33)

1

This invention relates to broaching machines, and more particularly to broaching machines for cutting spur gears and the like.

The use of the broaching method of cutting gears has heretofore been limited because of the great difficulty of maintaining concentricity between the gear teeth and the shaft receiving hole in the gear within the close tolerance limits desirable.

In the cutting of a gear in an internal broach the blank is positioned by the cutting teeth acting on the blank, which tend to center the blank with respect to its outer periphery and to flex the spindle upon which the blank is mounted if the axis of the spindle receiving hole in the blank does not coincide with the axis of the outer periphery of the blank. Also, inequalities in cutting action of angularly spaced cutting teeth of the broaches tend to cause the blank to drift and flex the spindle to an eccentric position during passage through the broach.

It is the object of the present invention to provide a broaching machine that has means for positively holding the gear blank against lateral movements with respect to the central axis of the broach during its movement through the broach so that the teeth cut by the broach are properly centered with respect to the spindle receiving hole in the gear blank regardless of the accuracy with which the said hole is centered with respect to the periphery of the blank.

With the above and other objects in view, the invention may be said to comprise the broaching machine as illustrated in the accompanying drawings, hereinafter described and particularly set forth in the appended claims, together with such variations and modifications thereof as will be apparent to one skilled in the art to which the invention pertains.

Reference should be had to the accompanying drawings forming a part of this specification, in which.

Figure 1:
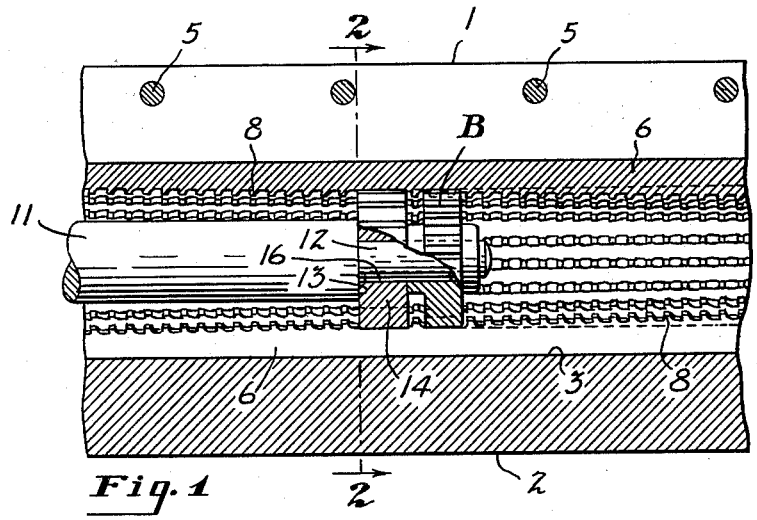
Figure 1 is a fragmentary central vertical section through a broach, showing the gear blank and the gear blank positioning and guiding means.
Figures 2, 3:
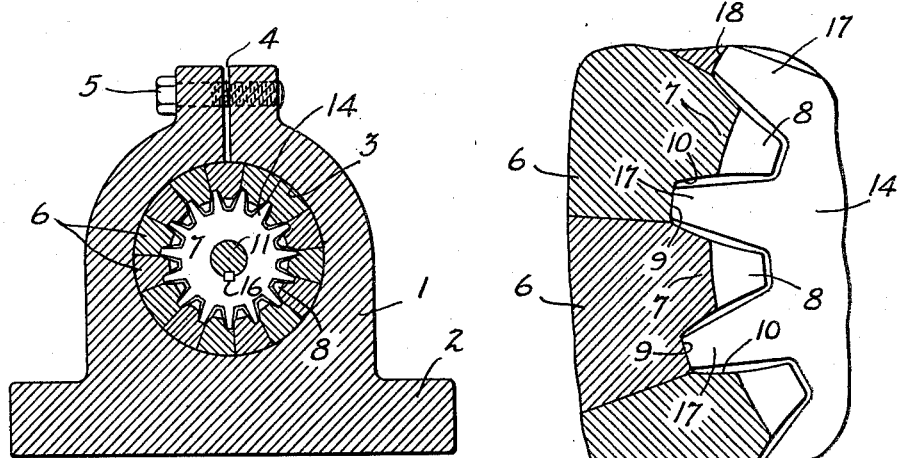
Fig. 2 is a transverse section taken on the line indicated at 2—2 in Fig. 1.
Fig. 3 is a fragmentary section showing the broach bars and positioning member on a larger scale.
Figure 4:
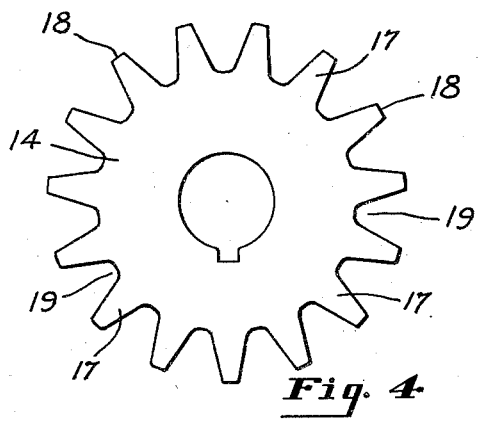
Fig. 4 is a plan view of the positioning member.

In the accompanying drawings the invention is shown applied to a gear broaching machine having an internal broach holder 1 provided with

2 a base 2 adapted to be attached to a suitable support and having a longitudinal bore 3 to receive the internal broach. The holder 1 has a vertical split 4 along the top thereof and is provided with tightening bolts 5 extending transversely across the split by means of which the bore 3 may be contracted.

The internal broach is composed of sectorshaped bars 6, the body portions of which fit within the wall of the bore 3 and form an annular wall within the bore 3, which is tightly clamped upon tightening the bolts 5. Each of the bars 6 is provided with an inner portion 7 of lesser width than its body portion and extending throughout the length thereof, along the edge of which a row of cutting teeth 8 is formed. The bars 6 are preferably identical so as to provide cutting teeth that are equiannularly spaced. Each of the bars has flat shoulders 9 along the bases of the inner portions 7 and spaced outwardly with respect to the teeth 8. The opposite sides 10 of the inner portions 7 of the bars taper from the shoulders 9 toward the cutting teeth 8, the sides 10 and shoulders 9 forming the sides and bottoms of guide grooves intermediate the rows of teeth 8.

The gear blank B to be cut is carried by a suitable spindle 11 that has a work receiving portion 12 of reduced diameter and a shoulder 13 at the inner end of the reduced portion 12. A work locating and guiding member 14 is mounted on the portion 12 of the spindle inwardly of the blank B. During the broaching operation thrust is exerted by the shoulder 13 against the guiding member 14 and the blank B is pressed against the guiding member by the action of the broach teeth. The blank B need not be held against rotation on the spindle unless it is desired that the gear teeth be in predetermined position with respect to a spline, in which case a suitable key 16 may be provided to position the blank with respect to the spindle. The guide member 14 is provided with integral radial projections 17 that extend into the grooves between the cutting teeth 8 and that have flat tips 18 that conform to and have sliding engagement with the flat shoulders 9 of the bars 6.

The guide member 14 is accurately centered with respect to the spindle 11 and centers the spindle 11 with respect to the internal broach, rigidly holding the spindle against lateral movements with respect to the broach during its longitudinal movement through the broach. The depth and spacing of the projections 17 of the guide member are such as to provide spaces 19 between the projections of a width and depth to receive the cutting teeth 8 with ample clearance. The gear blank B being rigidly secured to the spindle 11 closely adjacent to the guide member 14, is positively held against movement relative to the guide member 14 during its passage through the broach, and the teeth cut in the blank will be accurately centered with respect to the central hole of the blank, even though the hole may be appreciably eccentric with respect to the periphery of the blank. Since the gear blank is guided positively along the axis of the internal broach, there can be no drifting of the blank in the broach due to any inequalities in the cutting action of angularly spaced broach teeth.

As herein shown, the guide member 14 has the same number of teeth as the gear to be cut and engages in each of the spaces between the rows of cutter teeth of the broach. It is not essential, however, that the guide member engage in every such space, since the same guiding action may be obtained by engagement of a lesser number of guide projections.

By reason of the tapered walls 10 of the guide grooves in the broach, the projections of the guide members can be readily positioned in the grooves of the broach and clearance between the projections and the broach cutting teeth is insured.

It is to be understood that variations and modifications of the specific devices herein shown and described for purposes of illustration, may be made without departing from the spirit of the invention.

What I claim is:

1. In a broaching machine, an internal broach provided with angularly spaced axially extending rows of cutting teeth and axially extending guide surfaces between said rows of teeth, and a work spindle having a work receiving portion provided with a work locating and guiding member that has angularly spaced radial projections that slidably engage said guide surfaces and that have spaces between them that are wider and deeper than the said cutter teeth.

2. In a broaching machine, an internal broach provided with angularly spaced axially extending rows of cutting teeth and axially extending guide grooves between said rows of teeth, and a work spindle having a work receiving portion provided with a work locating and guiding member that has rigid radial projections of a depth and spacing to engage in grooves of said broach and to provide spaces between them in which said cutting teeth have clearance.

3. In a broaching machine, an internal broach provided with angularly spaced axially extending rows of cutting teeth and axially extending guide grooves between said rows of teeth, said grooves having flat bottoms and tapering side walls, and a work spindle having a work receiving portion provided with a work guiding and locating member having integral radial projections with flat tips that engage the flat bottoms of certain of said grooves, said member having spaces between said projections in which said cutting teeth have clearance.

4. In a broaching machine, an internal broach comprising elongated broach bars with sector shaped body portions that form an annular wall, each bar having an inner portion of less width than the body portion and formed to provide a row of cutting teeth along its edge, each bar having shoulders at the base of its inner portion and outwardly of its cutting teeth and each inner portion having inclined sides tapering from the said shoulders toward the cutting teeth, whereby the said bars provide tapering grooves between the rows of cutting teeth, and a spindle having a work receiving portion provided with a work locating and guiding member having rigid radial projections extending into grooves between cutting teeth and engaging the said shoulders.

RALPH N. TOZER.

REFERENCES CITED

The following references are of record in the file of this patent:

UNITED STATES PATENTS

| Number | Name | Date |
| --- | --- | --- |
| 520,995 | Kunz | June 5, 1894 |
| 1,986,793 | Chapman et al. | Jan. 8, 1935 |
| 2,102,071 | Hart | Dec. 14, 1937 |